3,726,696
REFRACTORY PARTICULATES
Robert E. Ott, Bel Air, Md., assignor to
SCM Corporation, Cleveland, Ohio
No Drawing. Continuation-in-part of application Ser. No. 817,128, Apr. 17, 1969. This application Aug. 28, 1970, Ser. No. 67,996
Int. Cl. B01j 11/06; C03c 5/02
U.S. Cl. 106—48          1 Claim

ABSTRACT OF THE DISCLOSURE

Discrete pieces of specially preformed refractory ceramic are useful in loose condition, bonded together in shapes, or subsequently bonded onto or into a substrate for use in apparatus or articles for the elevated temperature decomposition of combustible carbonaceous substances, e.g. fats, suitably in fume-treating apparatus, food cooking oven walls, fume handling and heat treating equipment, paper, incinerators, hot food conveyors, etc. The ceramic is the porous, sorptive structure obtained by heat interacting elemental metal-containing enameling composition, then arresting by cooling the ensuing reaction before substantial coalescene of the structure occurs. The enameling composition comprises alkali-bearing glass frit particles, about ½–25% halide based on the weight of said frit, and about 2–75 parts per 100 parts of solids in said composition of particles of elemental metal, particularly aluminum, magnesium, high alloys of either, and mixtures of same.

---

This application is a continuation-in-part of my copending U.S. patent application S.N. 817,128 filed Apr. 17, 1969, now U.S. Pat. 3,580,733. The disclosure of that parent application is incorporated by reference herein.

The instant invention relates to discrete pieces of specially preformed refractory ceramic, the porous, sorptive material obtained by heat interacting elemental metal-containing enameling compositions, then arresting the ensuing reaction before substantial coalescene of the structure occurs. The enameling composition comprises alkali-bearing glass frit particles, about ½–25% halide based on the weight of said frit, and about 2–75 parts per hundred parts of solids in said composition of particles of elemental metal, particularly aluminum, magnesium, high alloys of either, and mixtures of same. In basic structure this ceramic is the preformed discrete piece counterpart of the continuous cleaning ceramic coating more fully described in the parent application.

The discrete pieces of this performed ceramic can be used as such, or bonded together in shapes, or bonded into or onto a substrate for use in apparatus for the elevated temperature decomposition of combustible carbonaceous substances such as fat. The pieces or their aggregates also can be used as catalyst supports. A principal advantage over related prior art compositions is the great versatility of their application.

Thus, the ceramic particles of this invention can be used when retained in containers or envelopes, held in a membrane, adhered to a surface such as metal plate with a binder, or bonded together in self-supporting relationship for filling or stacking in a space therefor.

The teachings of parent application S.N. 817,128 apply here, particularly as to the frits, the porcelain enameling compositions including slips, finely-divided elemental metals, the blending and mixing procedures, the application of the resulting mixtures to metal substrates (if practiced for subsequent spalling off), firing ranges and times for the mixtures, test procedures for the resulting ceramic material, and the nature of such ceramic.

Additionally, various metal oxides (and metal oxide-providing substances under firing conditions) such as those of iron, nickel, cobalt, vanadium, copper, molybdenum, calcium, and silver can be incorporated into the slip or be smelted into the frit in minor (and usually minute—e.g., 0.1–15%) proportions, if desired, to interact with the elemental metal at firing temperature and assist in providing vesicular structure, as well as possibly providing catalytic sites for oxidation or other chemical reaction. Furthermore, the particles or their aggregates can be coated in conventional manner with known catalysts such as reforming, hydrogenation, dehydrogenation, oxidation, and cracking catalysts, e.g. those containing Group VIII metals, rare earths, manganese, Group VI–B catalytic substances such as nickel tungsten sulfide, etc., because of the refractoriness of the particle and its ability to withstand further heat treatment and handling.

While the particulate is best made with finely-divided elemental metal such as aluminum intermixed into a porcelain enameled composition, it is also conceivable to use fine wire, ribbon or sheet, with the porcelain enameling composition coating such substrate for firing.

The simplest way to make the particulate is to make a continuous cleaning ceramic coating like that of the parent application, S.N. 817,128, on a metal substrate such as a porcelain enameling iron or steel, then spall off the coating into particles by scraping, bending, thermal shock and/or impact. In such instance thick, spallable coats in excess of 25 grams per square foot can be used to advantage, and pickling and nickel or cobalt flashing of the substrate, or use of specialty steel substrates can be dispensed with for easier removal of the particulates. The particles then can be classified as to size for use as such (usually 100 mesh (Tyler) or finer) or for aggregation, and some or all can be ground if necessary or desired by conventional milling means.

Alternatively and preferably, however, for efficiency and economy it is preferred to form the elemental metal-porcelain enameling composition unfired into small aggregates using a little water and, often desirably, a fugitive binder. The particulates formed for firing can be of any reasonable size from exceedingly small, like grains of sand, on up to ¼" or even larger balls or cylinders. They can even be shaped into the desired product configuration before firing. Because of the vigorousness of the reaction in firing, pellets so formed should not be substantially larger than ⅛" to ½" in their largest dimension for good operational control and safety.

The thus-formed pellets should promptly be fired to minimize gassing. The preferred firing technique is by direct radiant heat, especially in apparatus that has rapid heat-up and cool-down effectiveness. Such apparatus is described in the Orth U.S. Pat. 3,322,413. Other useful ways of firing include electrical induction heating of the particles, rotary calcination, or firing in saggers or on other supports in a tunnel kiln and the like, suitably in an oxidizing atmosphere, but also a neutral atmosphere, or even a reducing atmosphere if no organic material is used. To arrest the reaction at the desired point, rapid cooling of fired particles with forced air and/or indirect contact with cooled surfaces is particularly desirable for good process control.

To bond together the resulting ceramic particulates in a self-supporting relationship, small amounts of conventional adhesives can be used. Thus refractory cements such as sodium silicates, glass frit particles melting below about 1450° F., and sodium aluminate-silicate mixtures, etc. can be utilized, preferably in proportions from about 3 to 15 weight percent binder solids per unit weight of the refractory ceramic particles.

If the bonding is to be transitory, or the bonded particle to be used at reasonably low temperature, other bonding agents can be used, e.g. starch, albumen, thermoplastic or thermosetting synthetic resins, and even fairly high temperature-resistant resins such as silicone resins, polytetrafluoroethylene resin, polyimide and polyamide resins, and the like. Such bonding agent can be mixed with the ceramic particles and the mass formed and set by hardening, drying or curing; alternatively, the bonding agent can be applied to a substrate in receptive state, the particles applied for adhesion, and the bonding set. In some cases, with thermoplastic bonding agents, it can be of advantage to heat the bonding agent, such substrate, and/or the particles themselves for the application.

The very fine particles of the refractory ceramic can be incorporated into or onto membranes such as paper by conventional incorporation into the web-making process or onto the web in a bound coating.

Frequently it is desirable to take a conventional porcelain enameled metal plate, e.g. steel or aluminium, apply the particulates to the porcelain enameled surface, then refire to porcelain enameling temperature and cool the coated plate to adhere the particles to the surface. If the substrate is porcelain enameled steel, it is often desirable but not necessary to use essentially the same porcelain enameling composition for the porcelain enamel undercoat as used for the ceramic particulate manufacture. Thus, the firing procedures and equipment schedule is simplified. Alternativeely, however, especially where it is desirable or necessary for the substrate to be restricted in firing temperature as, for example, an aluminum substrate, the undercoat porcelain enamel can be one that matures for aluminum enameling at a much lower temperature than an enameling composition for steel; in this way the refiring and the bonding of the refractory particle can be done at a temperature which will not damage the substrate.

The pieces of this preformed refractory ceramic by themselves, bonded together in aggregates, or supported on substrates can be added to, formed into, or loaded into apparatus for exposure to fumes, e.g. for heat treating and cooking apparatus including walls and ducts thereof, hot food conveyors, cartridges for fume treatment with appropriate inlets and outlets and fume path therebetween, heat exchanger surfaces, turbine blades, afterburners for fuel, automotive and other mufflers, furnace, burner, and brazier grates, bowls and other structures, hibachis, stove pipes, prefabricated fireplaces, carburization and enameling chambers, combustion chambers including ones with auxiliary heating means, grease collectors, incinerators, and additive to smoking tobacco or other combustible material, cigarette paper and the like.

The following examples show ways in which the invention has been practiced, but should not be construed as limiting the invention. Unless otherwise expressly specified, all temperatures herein are in degrees Fahrenheit, all parts are parts by weight, and all percentages are by weight. Mesh sizes are Tyler Standard.

EXAMPLE 1

A raw batch described below was smelted at 2150° F. and converted into frit by quenching in conventional manner:

| Component: | Weight percent |
|---|---|
| Silica | 29.3 |
| Sodium carbonate | 18.5 |
| Fluorspar (calcium fluoride) | 3.4 |
| Zinc oxide | 1.5 |
| Sodium silicofluoride ($Na_2SiF_6$) | 5.9 |
| Rutile ($TiO_2$) | 3.0 |
| Lithium carbonate | 5.1 |
| Zircon | 20.5 |
| Barium carbonate | 0.88 |
| Rasorite ($Na_2B_4O_7$) | 11.0 |
| Cobalt oxide | 1.0 |

The frit was ground in a ball mill to −325 mesh (Tyler Standard), then three weight parts of it blended with one weight part of atomized aluminum metal powder. The resulting blend was mixed with binder solution and pelletized into approximately ⅛″ diameter ball-like pellets. The binder solution was a mixture of: (a) 25 parts of alkylphenoxy polyethoxy ethanol sold under a trademark of "Triton X–100" and produced by Rohm & Haas Company; (b) 110 parts of ammonia-neutralized acrylic acid resin dispersed in water, the water constituting 75% by weight of the dispersion, the dispersion being sold under the trademark "Acrysol P6N" also produced by the Rohm & Haas Company; (c) 1975 parts of water; and (d) 0.3 part of nitropropane. Sufficient of the binder solution was used to form a heavy paste of the solids for pelletizing, the weight ratio of binder solution to frit plus aluminum metal being about 1:20.

The pellets were quickly dried with warm air, placed on a fire clay slab, and fired by radiant heat for 4 minutes at 1480° F. in an Orth kiln like that described in Example 1 of U.S. Pat. 3,322,413. Under the heat the pellets slightly swelled initially, scintillated, appeared to burn slowly, then the burning subsided. The resulting dark pellets were air-quenched and could be used as such for the purposes of this invention.

Other pellets were made in essentially the same manner with weight ratios of aluminum metal to frit of 10/90, 15/85 and 20/80. In place of aluminum metal, one can substitute magnesium metal powder (which makes for a substantially more vigorous reaction), or high alloys of either aluminum or magnesium in particulate form to get similar effects.

EXAMPLE 2

An aliquot of the "25% aluminum" pellets prepared in Example 1 were crushed to 100 mesh and finer size. A conventionally porcelain enameled 20 gauge steel plate (the plate conventionally pickled and nickel-flashed, and the enamel thereon being the heat vitrification product of a wet-milled porcelain enameling slip made from a mixture of 100 parts of the frit of Example 1, 2 parts of conventional porcelain enameling clay, ¼ part of bentonite clay ⅜₄ part of barium chloride, and ⅝₄ part of sodium aluminate, said slip containing only a trace of particulate material retained on 325 mesh sieve, said slip having been air-dried on the plate, then fired at 1400° F. for 3 minutes and cooled to room temperature) was dusted with the crushed ceramic pellets to cover completely the porcelain enamel surface. The thus-coated plate was fired for 3 minutes at 1400° F. to adhere the crushed particles to the undercoat porcelain enamel, then cooled in air to yield a dark, rough surface.

On this surface there was brushed a stripe of refined corn oil, about 15 milligrams per square centimeter. The panel was heated in air for one hour at 375° F., then the temperature was raised to 525° F. for two hours. No oil residue or resulting varnish could be detected by the naked eye after this test. No apparent staining remained detectable by the naked eye after the test.

EXAMPLE 3

A steel panel coated and fired essentially as shown in Example 2 of U.S. patent application S.N. 817,128 was subjected to bending and impact to spall off the fired ceramic coating. 70 parts of pulverized, spalled coating was dispersed by mixing with 35 parts of the binder solution like that of Example 1 except that it contained one part of sodium silicate dissolved therein and no nitropropane. A 20-gauge extra low carbon steel panel prepared conventionally for porcelain enameling (acid etched and flashed with nickel) was sprayed at the rate of 15 grams per square foot with the dispersion of binder and spalled particles. The panel was dried, then fired for 4 minutes at 1480° F., and finally air-cooled. When tested with corn oil in the manner of Example 2, visible residue and stain on the resulting coated panel were virtually non-existent.

What is claimed is:

1. Particulate refractory matter consisting of discrete, self-supporting pieces of the preformed product made by the process which comprises:

admixing a porcelain enameling composition and 2–75 parts per 100 parts of solids of said composition of particulate elemental metal selected from the group consisting of aluminum, magnesium, high alloys of either, and mixtures of same, said porcelain enameling composition consisting essentially of alkali borosilicate glass frit particles and about ½–25% of halide based on the weight of said frit particles, the halide being incorporated into said porcelain enameling composition as a component of said frit or as a mill additive;

placing the resulting admixture on a support;

heating the supported admixture in a heating zone at a temperature between about 1300° and about 1600° F. for sufficient time until there is formed by interaction of said porcelain enameling composition and said particulate metal an integral, porous, sorptive structure containing crystalline devitrification products, said time at said temperature being between about 2½ and about 8 minutes;

then, after said sorptive structure is formed, arresting said interaction by cooling the resulting heat reaction product in a cooling zone before substantial coalescence of said structure occurs; and removing the resulting product from said support in the form of discrete pieces.

References Cited

UNITED STATES PATENTS

| | | | |
|---|---|---|---|
| 2,889,238 | 6/1959 | Long et al. | 106—48 |
| 2,898,236 | 8/1959 | Long et al. | 106—48 |
| 2,900,276 | 8/1959 | Long et al. | 106—48 |
| 3,278,324 | 10/1966 | Nelson | 106—48 |

WINSTON A. DOUGLAS, Primary Examiner

M. L. BELL, Assistant Examiner

U.S. Cl. X.R.

252—463, 475